E. SCHNEIDER.
APPARATUS FOR CHARGING HYDROPNEUMATIC RECUPERATORS OF GUNS WITH LIQUID AND GAS UNDER PRESSURE.
APPLICATION FILED FEB. 14, 1918.

1,318,605.

Patented Oct. 14, 1919.
10 SHEETS—SHEET 1.

Fig. 1.

E. SCHNEIDER.
APPARATUS FOR CHARGING HYDROPNEUMATIC RECUPERATORS OF GUNS WITH LIQUID AND GAS UNDER PRESSURE.
APPLICATION FILED FEB. 14, 1918.

1,318,605.

Patented Oct. 14, 1919.
10 SHEETS—SHEET 2.

E. SCHNEIDER.
APPARATUS FOR CHARGING HYDROPNEUMATIC RECUPERATORS OF GUNS WITH LIQUID AND GAS UNDER PRESSURE.
APPLICATION FILED FEB. 14, 1918.

1,318,605.

Patented Oct. 14, 1919.
10 SHEETS—SHEET 5.

Fig. 5.

E. SCHNEIDER.
APPARATUS FOR CHARGING HYDROPNEUMATIC RECUPERATORS OF GUNS WITH LIQUID AND GAS UNDER PRESSURE.
APPLICATION FILED FEB. 14, 1918.

1,318,605.

Patented Oct. 14, 1919.
10 SHEETS—SHEET 6.

Fig. 6.

E. SCHNEIDER.
APPARATUS FOR CHARGING HYDROPNEUMATIC RECUPERATORS OF GUNS WITH LIQUID AND GAS UNDER PRESSURE.
APPLICATION FILED FEB. 14, 1918.

1,318,605. Patented Oct. 14, 1919.
10 SHEETS—SHEET 7.

E. SCHNEIDER.
APPARATUS FOR CHARGING HYDROPNEUMATIC RECUPERATORS OF GUNS WITH LIQUID AND GAS UNDER PRESSURE.
APPLICATION FILED FEB. 14, 1918.

1,318,605.

Patented Oct. 14, 1919.
10 SHEETS—SHEET 8.

UNITED STATES PATENT OFFICE.

EUGÈNE SCHNEIDER, OF LE CREUZOT, FRANCE, ASSIGNOR TO SCHNEIDER & CIE., OF PARIS, FRANCE, A LIMITED JOINT-STOCK COMPANY OF FRANCE.

APPARATUS FOR CHARGING HYDROPNEUMATIC RECUPERATORS OF GUNS WITH LIQUID AND GAS UNDER PRESSURE.

1,318,605.   Specification of Letters Patent.   Patented Oct. 14, 1919.

Application filed February 14, 1918. Serial No. 217,188.

*To all whom it may concern:*

Be it known that I, EUGÈNE SCHNEIDER, a citizen of the French Republic, and a resident of Le Creuzot, Saône-et-Loire, France, have invented a new and useful Improvement in Apparatus for Charging Hydropneumatic Recuperators of Guns with Liquid and Gas Under Pressure, which invention is fully set forth in the following specification.

For the purpose of maintaining a suitable charge of liquid in the hydro-pneumatic recuperators of guns, use has been made hitherto of a liquid pump which is carried separately from or is located permanently on the gun. This pump is connected at the proper moment to the liquid chamber of the recuperator, and is itself charged with liquid in the quantity required by circumstances. On the other hand, in order to maintain sufficient gas pressure above the level of the liquid in the recuperator, the chamber of the recuperator is recharged with gas either by means of another pump or by means of a reservoir of gas under pressure which is carried separately from or is located on the gun.

Those known arrangements are bulky and require long and complex operations for bringing them into and out of position.

The present invention has now for its object to utilize the pressure of the gas in a charging reservoir for the purpose of recharging the recuperator with liquid that may be stored in a separate reservoir located permanently on the gun. According to a particularly simple constructional feature of this invention the liquid may also be stored in the reservoir that contains the gas for recharging. In such a case the charging of the liquid by means of the gas is effected by giving a suitable inclination to the common reservoir for the purpose of effecting this operation.

Various practical embodiments of this invention are illustrated by way of example in the accompanying drawings in which:—

Fig. 1 is a front elevation partly in section, showing the general arrangement of the hydro-pneumatic recuperator of the gun, with charging reservoirs located in the cradle.

Fig. 2 is a corresponding side elevation.

Fig. 3 is a partial vertical longitudinal section on the line III—III of Fig. 1; the gun being assumed to be horizontal in these two figures.

Fig. 4 is a section similar to Fig. 3, but showing the gun suitably inclined for the purpose of effecting the recharging with gas.

Fig. 5 is a vertical longitudinal section on the line V—V of Fig. 1.

Fig. 6 is a partial vertical longitudinal section, drawn to a larger scale, taken along the axis of the reservoir containing the charging liquid.

Fig. 7 is a partial longitudinal section, drawn to a larger scale, on the line VII—VII of Fig. 1.

Figs. 8 to 11 illustrate a second embodiment of the invention wherein the liquid and gas recharging reservoirs are combined to form a single removable reservoir which is assumed to be located in the recoiling part (in the gun slide).

Referring now to Figs. 1 to 7, A is the barrel of any desired type of gun; with this barrel there recoils the piston B of the hydro-pneumatic recuperator constructed in or carried by a fixed part, such as the cradle C.

This recuperator may be of any desired known construction and it may comprise for instance a cylinder D permanently full of liquid, wherein a piston B is adapted to work. This cylinder communicates through a port $d$ with an intermediate chamber E which in turn communicates through a port $e$ with an upper cylinder F in which the desired quantity of gas under pressure is contained above a suitable level of liquid.

In accordance with this invention the gun comprises the following apparatus for recharging liquid and gas.

Figure 1:
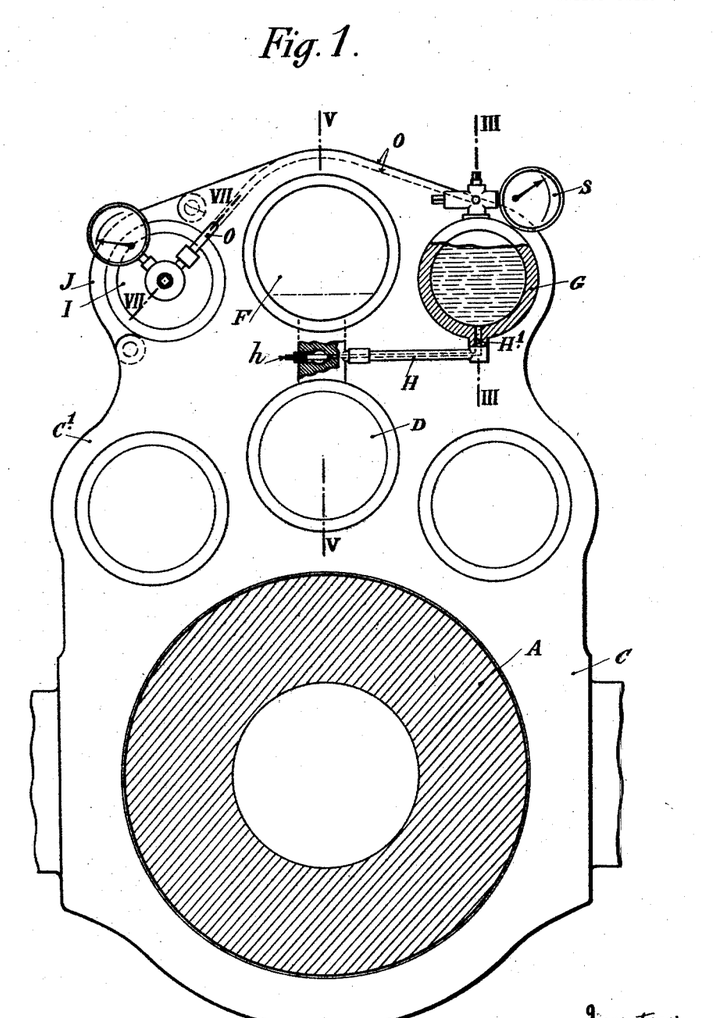
Figures 1 to 7 inclusive illustrate a first embodiment comprising a reservoir containing charging liquid, and a reservoir of gas under pressure, the two reservoirs being suitably connected together and to the recuperator by a connecting duct located between the recuperator and the liquid reservoir. These two charging reservoirs are mounted in this example in a fixed part of the gun, such as the cradle.
Figure 2:
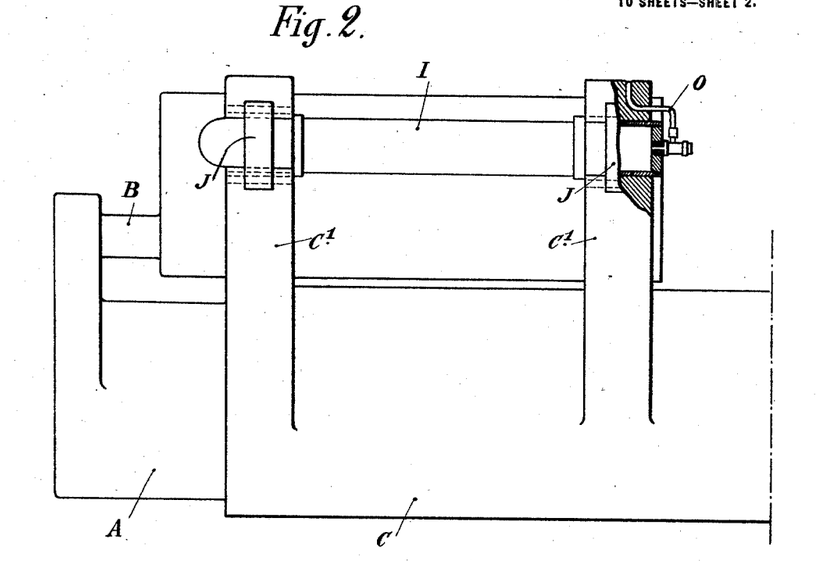
Figure 3:
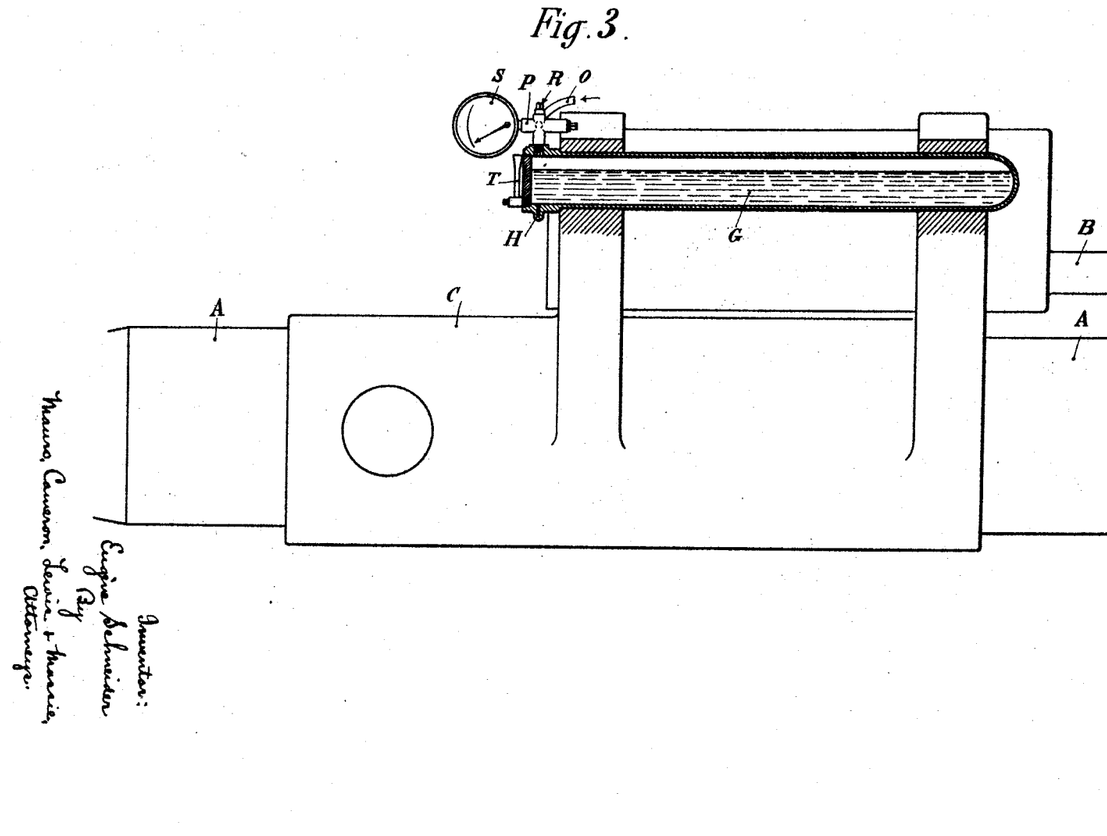

A reservoir G containing liquid for recharging is located permanently in the cradle C at a suitable level, for instance as indicated in Fig. 1. This reservoir may be a separate structure or it may be fitted permanently in a lodgment provided for it in the cradle, or in a bracket fixed to the latter. If desired, this reservoir may be hollowed out in the body of the cradle in which the cylinders of the recuperator and of the brakes are formed.

The reservoir G communicates at its forward part through a duct H with a part of the recuperator that is always full of liquid, that is to say, in the example shown it communicates with the intermediate cylinder E. The communication between the duct H and the reservoir G may be permanently open. On the other hand however, the communication between the duct H and the cylinder F is normally closed by a valve, such as the needle valve $h$ (Fig. 1).

A reservoir I containing gas under pressure is mounted in a removable manner and preferably symmetrical to the recharging reservoir G relatively to the longitudinal axis of the gun.

This reservoir I may for example be fixed to brackets $C^1$ projecting from the cradle by means of straps J.

Figure 6:
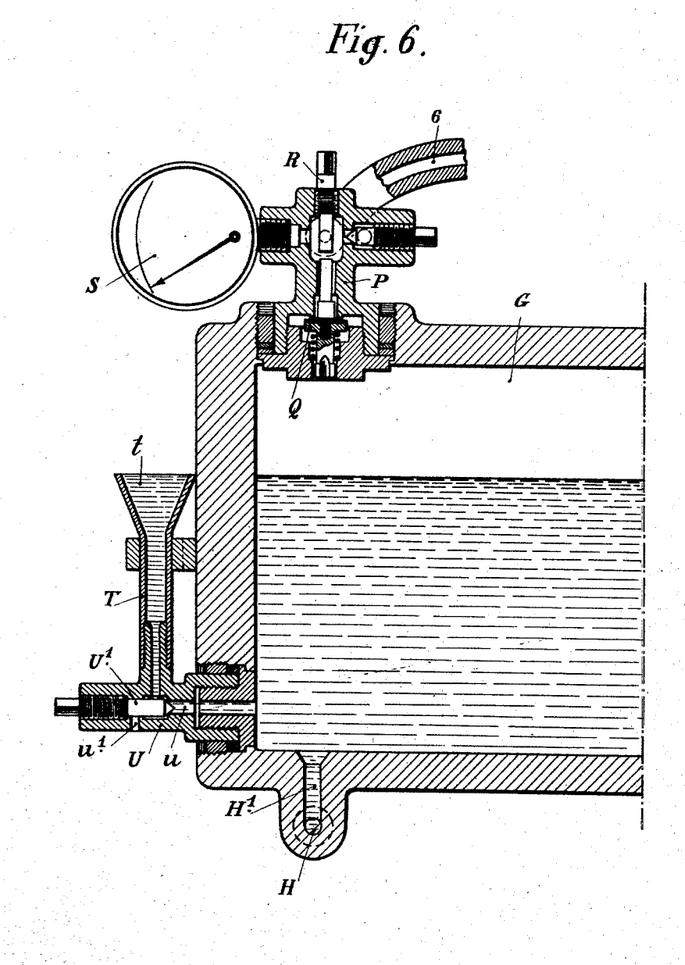
Figure 7:
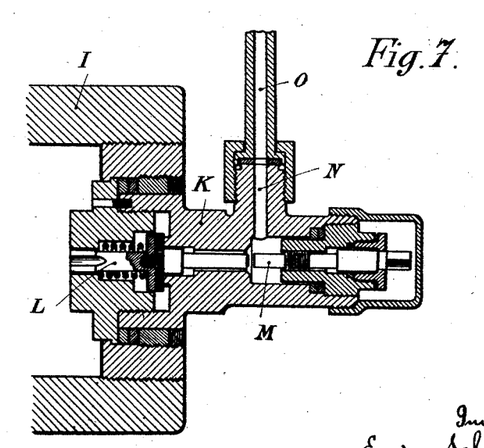
Figure 8:
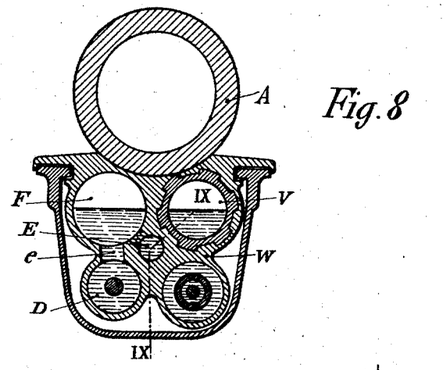
Fig. 8 is a vertical cross section showing the general arrangement of the hydro-pneumatic recuperator with its single recharging reservoir for liquid and gas located in the gun slide.
Figure 9:
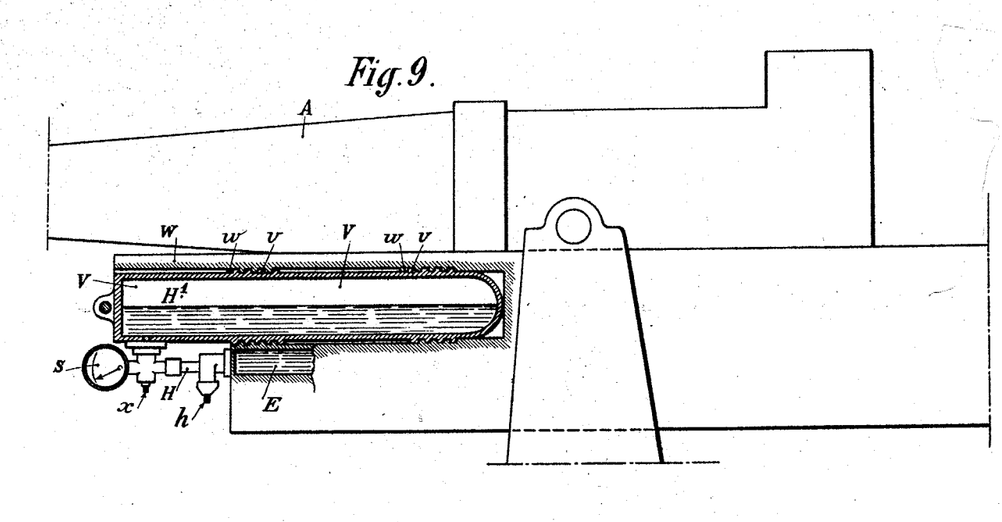
Fig. 9 is a side elevation partly in section on the line IX—IX of Fig. 8, the gun being assumed to be horizontal in both figures.

In one of the ends of the reservoir I there is located a plug K shown in detail in Fig. 7. In this plug there is fitted an obturator L which is adapted to be forced from its seat by means of a spindle M operable from the outside, for the purpose of placing the reservoir I in communication with a boss N which is connected by a duct O to a union P (Fig. 6) fixed on the front end of the upper part of the reservoir G. In this union P there is mounted an obturating valve Q which is normally held upon its seat and which can be opened from the outside by means of a spindle R when it is desired to establish communication between the gas chamber of the reservoir G and the compressed gas reservoir I.

When it is desired to recharge the recuperator D—E—F with liquid, the gun is maintained in a horizontal or approximately horizontal position. The valves L and Q are opened by operating respectively the spindles M and R in a suitable manner. The compressed gas can then pass from the reservoir I into the reservoir G. When this communication has been established, the spindle $h$ is operated so as to establish communication between the duct H and the cylinder E. The liquid is then forced out of the reservoir G into the recuperator. The recharging operation is stopped when the liquid in the cylinder F has reached the desired level; the spindles $h$, M and R are then closed.

Figure 4:
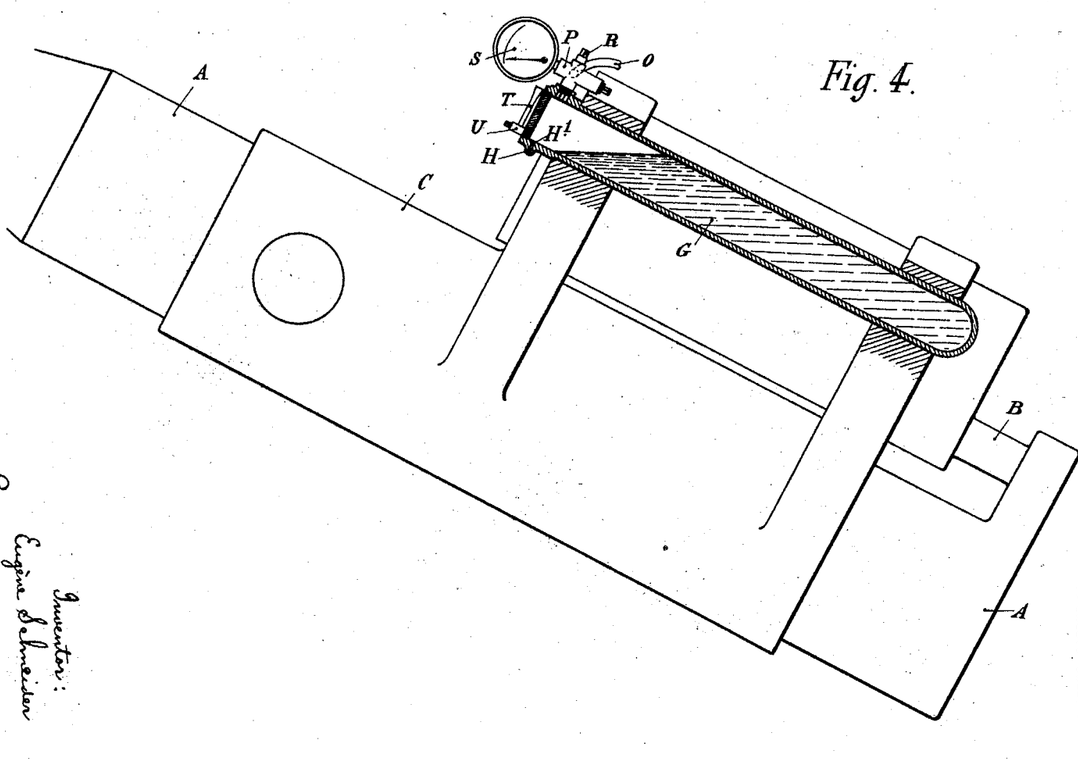
Figure 5:
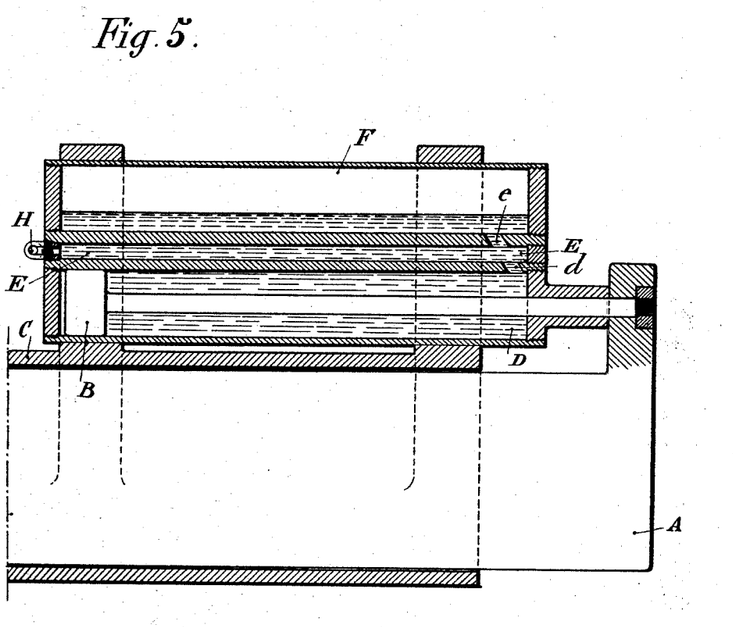

When it is desired to recharge the cylinder F of the recuperator with gas, the gun barrel is brought to the requisite inclination, Fig. 4, in order to uncover the orifice $H^1$ through which the duct H opens into the reservoir G of recharging liquid. Then the recuperator can be placed into communication with the gas chamber of the reservoir G, and through the latter with the duct O and the reservoir I, by opening of course for this purpose the two valves Q and L and the spindle $h$. The recharging is stopped when the pressure in the reservoir F has reached the requisite amount.

The reservoir G may, as shown in Fig. 6, be provided with a filling and blow-off pipe connection. A tube T terminating at its free end in a funnel $t$ may be placed in communication with the reservoir G through a passage $u$ formed in a union U. This communication may be closed normally by means of a spindle valve $U^1$. It is to be understood that the filling of the liquid is to be effected when the reservoir G is under atmospheric pressure.

The union U may have a blow-off hole $u^1$ which can be uncovered by suitably screwing back the spindle U.

In the example shown in Figs. 8 to 11, the recharging liquid reservoir and the compressed gas reservoir are united in a single vessel V mounted in a removable manner, for instance by hooking by means of full sectors $v$ alternating with plain sectors, behind corresponding sectors $w$ of the gun slide W.

In the same manner as in the preceding example a duct H connects the intermediate cylinder E of the recuperator E—D—F to the lowest point of the forward end of the single recharging reservoir. A spindle valve $h$ allows of shutting off normally the recuperator from the duct H.

A single obturating valve X located in a union piece, at the bottom of the forward end of the reservoir V, serves to shut off normally the orifice H¹ of communication between the duct H and the said reservoir. The valve X may be lifted off its seat by means of a spindle $x$.

When it is desired to recharge the recuperator with liquid, the gun is brought into the horizontal position (Figs. 8 and 9), and the communication between V and E is opened by raising the valve X and moving the spindle valve $h$ away from its seat. The valves $h$ and X are closed when the charging is completed.

If it is desired to recharge the recuperator with compressed gas, the gun is brought to a suitable inclination (Fig. 10) in such a manner as to uncover the valve X and the communication duct H¹.

Figure 10:
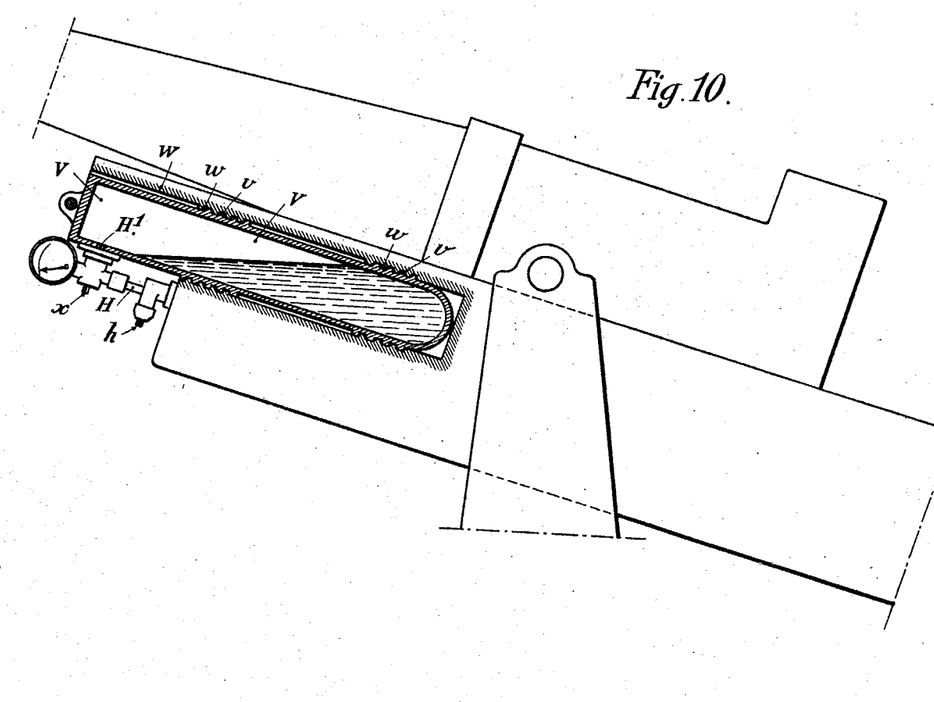
Fig. 10 is a side elevation partly in section similar to Fig. 9, wherein the gun is assumed to be suitably inclined for the purpose of recharging with compressed gas.
Figure 11:
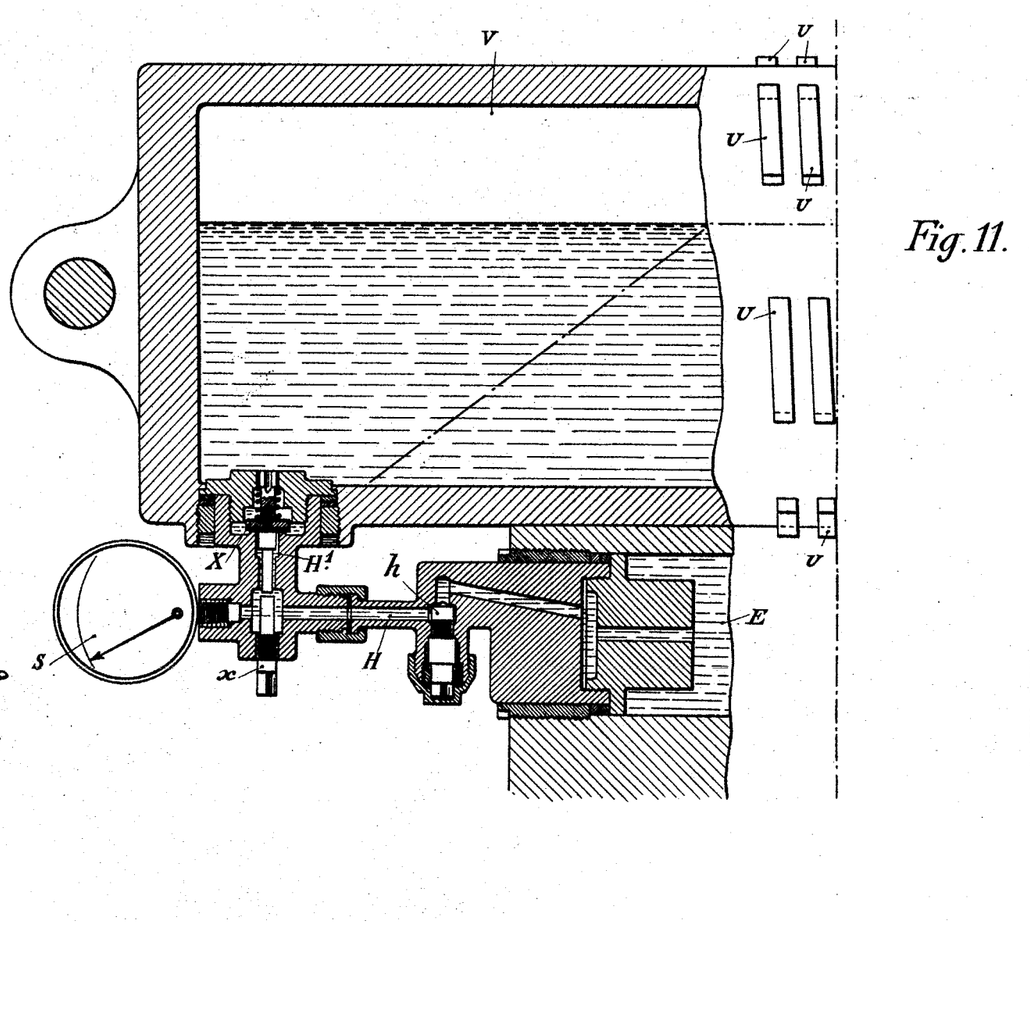
Fig. 11 is a partial vertical longitudinal section, drawn to a larger scale, showing the details of the valves and communicating ducts located between the single recharging reservoir and the recuperator.

The valves X and $h$ being then moved away from their seats, the gas chamber of the reservoir V will communicate directly with the recuperator.

Figure 12:
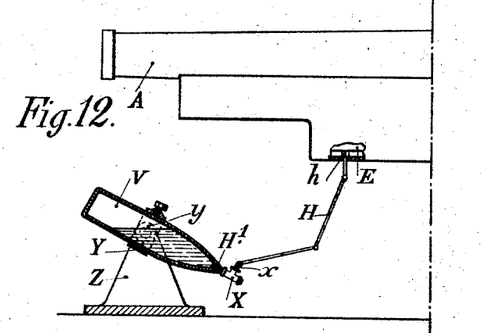
Figs. 12 and 13 are sectional elevations showing two positions respectively when charging with liquid and when charging with gas, of one embodiment of the apparatus wherein a common reservoir is employed which is not fixed to the gun.
Figure 13:
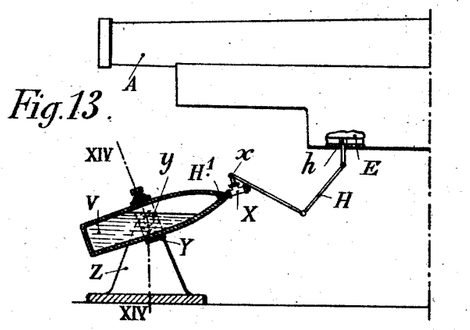
Figure 14:
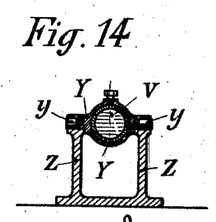
Fig. 14 is a cross section on the line XIV—XIV of Fig. 13.

A particularly simple embodiment of the invention is illustrated in Figs. 12 and 13.

In this embodiment a reservoir V containing together a store of recharging liquid and a suitable store of gas under pressure, is mounted in a removable manner by means of a collar Y provided with trunnions $y$ in a pedestal bearing Z which may itself be removable, or permanently located at a suitable point of the gun carriage. As in the preceding example, the reservoir V is provided with a valve, such as X, which can be raised off its seat by means of a spindle, such as $x$. A flexible pipe H is adapted at the proper moment to be provided between the obturating member of the reservoir V and the intermediate reservoir E of the recuperator, provided with a shut off needle valve $h$. On inclining alternately the reservoir V so as to bring it into positions such as that shown in Fig. 12, and that shown in Fig. 13, the liquid can be caused to cover and uncover the duct H¹. By operating the needle valves $x$ and $h$ in the manner described in the preceding example the recuperator can be recharged with liquid and gas alternately.

What I claim is:—

1. In apparatus for charging hydro-pneumatic recuperators for guns with liquid and compressed gas, the combination with the recuperator of a recharging reservoir, a valve-controlled conduit connection between said reservoir and recuperator, and a tilting support for said reservoir to shift the positions of said liquid and gas charges therein for delivering either liquid or gas through said conduit to replenish said recuperator.

2. In apparatus for recharging a hydro-pneumatic recuperator on a gun with liquid and compressed gas, the combination with the recuperator, of a recharging liquid reservoir, a recharging gas reservoir, means of communication between the two reservoirs, and a duct between said liquid reservoir and the recuperator, the outlet of said duct opening into the recuperator being located at a level such that said outlet will be covered with liquid when the gun barrel is horizontal, whereas when the gun barrel is inclined at a determined angle, said outlet will be uncovered and allow gas to pass into the recuperator.

3. In apparatus for charging hydro-pneumatic recuperators for guns with liquid and compressed gas, the combination of a gun-supporting cradle, a recuperator therefor, a recharging reservoir adapted to tilt with said gun support, and a valve-controlled conduit connection between said reservoir and said recuperator, whereby tilting of the cradle shifts the position of said liquid and gas charges in the reservoir for delivering either liquid or gas through said conduit to replenish said recuperator.

In testimony whereof I have signed this specification.

EUGÈNE SCHNEIDER.

Witnesses:
ANDRE MOSTICKER,
CHAS. P. PRESSLY.

Copies of this patent may be obtained for five cents each, by addressing the "Commissioner of Patents, Washington, D. C."